United States Patent Office 3,016,358
Patented Jan. 9, 1962

3,016,358
METHOD OF PREPARING HARDENING
COMPOSITIONS
Edmond Hustinx, Looiersgracht 4, Maastricht,
Netherlands
No Drawing. Filed Oct. 30, 1959, Ser. No. 849,730
Claims priority, application Netherlands Apr. 16, 1956
22 Claims. (Cl. 260—23)

The invention is concerned with compositions capable of setting to relatively hard materials which are obtained by allowing a concentrated alkali silicate solution to react with a polymerizable ester of an olefinic alcohol with a carboxylic acid having not more than 18 carbon atoms.

This application is a continuation-in-part of patent application Serial No. 651,155, filed April 8, 1957, now abandoned.

If a polymerizable ester of this type, e.g. vinyl acetate, is mixed with a concentrated alkali silicate solution (waterglass), a reaction will set in after a few minutes, even at room temperature, said reaction being attended by a generation of heat. In this reaction the ester is saponified and the metal ion of the alkali silicate combines with the acetic acid which is a stronger acid than silicic acid. The vinyl alcohol will polymerize while at the same time longer silicic acid chains will be formed. It is also possible that organic bonds with the hydroxyl groups of the silicic acid are formed. Owing to said reactions the reaction mass will set to a more or less hard material.

In practice the alkali silicate solutions used are the concentrated commercial sodium or potassium silicate solutions. The ratio of $Me_2O$ (in which Me is alkali metal) to $SiO_2$ may be from 1:2 to 1:4.

The esters preferably used are those of vinyl alcohol, methyl vinyl alcohol, ethyl vinyl alcohol and benzyl vinyl alcohol.

Suitable carboxylic acids in the polymerizable esters to be used are fatty acids, preferable those having not more than 12 carbon atoms, e.g. acetic acid, propionic acid, lauric acid and stearic acid. Esters of hydroxy acids, e.g. lactic acid, may also be used.

The ratio between alkali silicate and polymerizable ester in the mixture may vary between wide limits and is generally comprised between 6 and 70 parts by weight of ester on 100 part by weight of the alkali silicate, calculated on dry material.

The reaction may be accelerated by using elevated temperatures. If desired, the temperature may be raised to above 100° C.; in this case porous compositions may be produced by the gases or vapours produced.

The properties of the compositions obtained may be modified by the incorporations in the reaction mixture of materials capable of forming condensation of polymerization products either per se or with the reaction components. Such materials are i.a.:

Halogenated organic compounds, e.g. chlorinated hydrocarbons, such as dichloroethylene, trichloroethylene, dichlorobutane and chlorinated paraffins, or halohydrins, e.g. dichlorohydrin or epichlorohydrin;

Esters or unsaturated organic acids, e.g. acrylic acid esters or linseed oil;

Unsaturated hydrocarbons, e.g. styrene;

Ketones, e.g. metal butyl ketone or cyclohexanone;

Aldehydes, e.g. formaldehyde;

Amino compounds, e.g. urea.

Other suitable additions are materials which have been previously polymerized or condensed; they do not take part in the reaction but may have a favourable influence on the properties of the final product.

Surface active substances may also be added, e.g. alkali metal soaps, e.g. sodium oleate, alkyl aryl sulfonates, fatty alcohol sulfates, non-ionic condensation products of polyethylene glycol and Twitchel reactive;

Hydrophobic substances may be emulsified or suspended in the reaction mixture in order to impart water repellent properties to the products obtained, e.g. bituminous materials such as coal tar, pitch, asphalt and the like.

If desired substances may be added which accelerate the polymerization or condensation reactions, for example aluminiumbutyl.

For various purposes a content of fillers in the final product is desired. As such may be mentioned, for example, wood meal, cellulose, sand, marl, clay, chalk or other minerals, coal, lignite, pigments, e.g. titanium oxide or ochre, and precipitated metal silicates.

The substances which take part in the reaction should generally be added in the first stage of the process. The additives which do not take part in the reaction may be added in any stage of the process provided the hardening has not yet proceeded so far that a uniform incorporation of said additives has become impossible.

The hardened compositions obtained according to the invention may be used for many purposes. It is impossible, for example, to use these compositions prior to or after their hardening for producing moulded articles. The composition may also be used as a coating, for example on walls, ceilings, bricks and surfaces of cement or concrete, furthermore on cardboard or paper. Mixed with pigments the composition may be incorporated into paints which are to be brushed or sprayed onto the surfaces or articles to be painted prior to the hardening. Said surfaces may previously be covered with diluted water-glass, if desired.

Another important application resides in the use of the composition for hardening the ground, for example in the construction of roads. To this end the still liquid composition is injected into the ground or, if only a superficial hardening is desired, is applied to the surface of the ground. In this case waste materials from plastics, which are rather cheap, may be added in the form of solutions in organic solvents.

The invention will be elucidated with reference to the following examples.

*Example 1*

1100 parts by weight of a potassium silicate solution containing 30% of dry matter and having a molecular ratio $K_2O:SiO_2=1:4$ is mixed with 86 parts by weight of vinyl acetate. After 10 minutes gelatinization sets in and the temperature rises from the initial temperature of 17° C to 21° C. The hardening proceeds slowly and after three days a hard, still somewhat resilient composition has formed.

If the reaction mixture is heated e.g. for 8 minutes, to above 100° C. hardening will proceed much more rapidly. The composition will swell and produce a light porous yellow coloured mass which forms an excellent water resistant insulating material.

*Example 2*

740 parts by weight of a sodium silicate solution containing 36% of dry matter and having a molecular ratio $Na_2O:SiO_2=1:3.4$ is diluted with 740 parts by weight of water. Subsequently 172 parts by weight of methylvinyl acetate, 2 parts by weight of sodium oleate and 1 part by weight of aluminiumbutyl are added with agitation. After 45 minutes the mass gelatinizes, the temperature rising by some degrees. After a few days a solid transparent or substantially transparent mass is obtained. If the reaction mixture is heated to over 100° C. the hardening proceeds rapidly and a dull yellow material is obtained.

Example 3

The reaction is carried out in the manner as described in Example 1, but to the still liquid mass 2000 parts by weight of a filler, for example marl, are added. Thus products are obtained which are suitable for use in the building industry and in the construction of roads.

Example 4

1100 parts by weight of a potassium silicate solution having a molecular ratio $K_2O:SiO_2=1:4$ are mixed with 54 parts by weight of partly polymerized ethylvinyl propionate and, if desired, with pigments. The mass obtained by the reaction may be used as a paint.

Example 5

6 parts by weight of vinyl acetate are mixed with 5 parts by weight of dichlorobutane and 100 parts by weight of sodium silicate containing 35% of dry matter and having a molecular ratio $Na_2O:SiO_2=1:3.4$. To this mixture 0.1% of an alkylarylsulfonate is added. After 30 minutes a white substance has formed, the solubility in boiling water of which is further reduced in the course of some months. Said material is suitable for the manufacture of moulded articles.

Example 6

In 10 parts by weight of vinyl acetate 2 parts by weight of polyvinyl chloride, polyvinyl acetate or polyethylene are dissolved. If desired, 2 parts by weight of methylbutyl ketone, cyclohexanone or cyclohexanol are added. This mixture is subsequently mixed with 100 parts by weight of sodium silicate containing 45% of dry matter and having a molecular ratio $Na_2O:SiO_2=1:2$.

Example 7

740 parts by weight of sodium silicate containing 35% of dry matter and having a ratio $Na_2O:SiO_2=1:3.4$ are mixed with 60 parts by weight of vinyl acetate and 40 parts by weight of acrylic acid ethyl ester and 10 parts by weight of a non-ionic condensation product of polyethylene glycol.

Example 8

740 parts by weight of sodium silicate containing 35% of dry matter and having a ratio $Na_2O:SiO_2=1:3.4$ is mixed with 70 parts by weight of vinyl acetate, 1 part by weight of a 30% aqueous solution of an alkylaryl sulfonate, 30 parts by weight of trichloroethylene, 20 parts by weight of dichlorohydrin and 350 parts by weight of fine sand. When the mixture is sufficiently set, it is cut into blocks.

Example 9

1000 parts by weight of sodium silicate (35%) having a ratio $Na_2O:SiO_2=1:3.4$, are mixed with 20 parts by weight of a neutralized Twitchel reactive and 3000 parts by weight of fine sand. A mixture of 100 parts by weight of vinyl propionate, 100 parts by weight of linseed oil and 20 parts by weight of formaldehyde is then added. A composition is obtained which can be advantageously used for road surfacing purposes. If desired, 100 parts by weight of coal tar or pitch may be incorporated into said composition.

Example 10

100 parts by weight of potassium silicate (25%) having a ratio $K_2O:SiO_2=1:4$, are mixed with 10 parts by weight of methylvinyl acetate, 5 parts by weight of styrene and 5 parts by weight of acrylic acid amyl ester.

Example 11

100 parts by weight of sodium silicate (30%) having a ratio $Na_2O:SiO_2=1:3.3$, are mixed with 5 parts by weight of urea, 1 part by weight of sodium dodecyl sulfonate (30%) and 10 parts by weight of vinyl acetate.

Example 12

100 parts by weight of sodium silicate (35%) having a ratio $Na_2O:SiO_2=1:3.4$, are mixed with 1 part by weight of an emulsifying agent, essentially consisting of a sulfonate of coal tar, 10 parts by weight of sodium siliconate and 10 parts by weight of vinyl laurate. The mixture is stirred until it has obtained a viscosity of 10 poises and is subsequently mixed with pigments, such as titanium oxide or ochre. In this way a suitable moulding material is obtained.

Example 13

This example is carried out in the same way as Example 12, however using 13 parts by weight of vinylstearate instead of 10 parts by weight of vinyllaurate.

Example 14

10 parts by weight of methyl vinyl lactate are mixed with 10 parts by weight of sodium stearate, 50 parts by weight of trichloroethylene and 50 parts by weight of methylisobutyl ketone. To this mixture are added 200 parts by weight of sodium silicate (30%) having a ratio $Na_2O:SiO_2=1:3.4$ and the whole is uniformly mixed. The composition obtained is suitable for being injected into the soil, the soil treated in this way being consolidated to a hard mass.

Example 15

100 parts by weight of a neutral sodium silicate solution having a ratio $Na_2O:SiO_2=1:3.4$ and a specific weight of 38° Bé., are uniformly mixed with a solution of 3 parts by weight of vinyl acetate, 50 parts by weight of bitumen and 50 parts by weight of a heavy fuel oil (viscosity 6500 sec.). The homogeneous mass is mixed with 500 parts by weight of sand. The material solidifies and is then i.a. suitable for covering roads, floors and roofs and for producing bricks for building purposes.

I claim:

1. A method of preparing hardening compositions which comprises mixing 100 parts by weight of a concentrated alkali silicate solution with from 6 to 70 parts by weight of a polymerizable ester of an olefinic alcohol with a carboxylic acid having not more than 18 carbon atoms and heating said mixtures between room temperature and about 100° C. until a hard mass is obtained.

2. A process according to claim 1, in which the concentrated alkali silicate solution is commercial sodium silicate solution.

3. A process according to claim 1, in which the concentrated alkali silicate solution is commercial potassium silicate solution.

4. A process according to claim 1, in which the polymerizable ester is a vinyl ester.

5. A process according to claim 1, in which the polymerizable ester is a methylvinyl ester.

6. A process according to claim 1, in which the polymerizable ester is an ethylvinyl ester.

7. A process according to claim 1, in which the polymerizable ester is an acetate.

8. A process according to claim 1, in which the polymerizable ester is a propionate.

9. A process according to claim 1, in which the polymerizable ester is a laurate.

10. A process according to claim 1, in which the polymerizable ester is a stearate.

11. A process according to claim 1, in which the polymerizable ester is a lactate.

12. A process according to claim 1, in which a compound selected from the group consisting of dichloroethylene, trichloroethylene, dichlorobutane, chlorinated paraffins, dichlorohydrin and trichlorohydrin is added.

13. A process according to claim 1, in which a ketone selected from the group consisting of methylbutyl ketone, methylisobutyl ketone and cyclohexanone is added.

14. A process according to claim 1, in which formaldehyde is added.

15. A process according to claim 1, in which an acrylic acid ester is added.

16. A process according to claim 1, in which linseed oil is added.

17. A process according to claim 1, in which a high molecular weight polymeric material selected from the group consisting of polyvinyl compounds and polyethylene is added.

18. A process according to claim 1, in which a bituminous material is added.

19. A process according to claim 1, in which a surface active substance selected from the group consisting of alkali soaps, alkylaryl sulfonates, alkyl sulfates, non-ionic condensation products of polyethylene glycols, coal tar sulfonates and Twitchel reactives is added.

20. A process according to claim 1, in which a filler is added.

21. A method of preparing hard porous composition which comprises mixing 100 parts by weight of a concentrated alkali silicate solution with from 6 to 70 parts by weight of a polymerizable ester of an olefinic alcohol with a carboxylic acid having not more than 18 carbon atoms and heating said mixture to a temperature above the boiling point of the aqueous solution in the reaction mixture and below the decomposition temperature of the organic material therein.

22. A process for improving the firmness of a soil which comprises incorporating a mixture of 100 parts by weight of a concentrated alkali silicate solution with from 6 to 70 parts by weight of a polymerizable ester of an olefinic alcohol with a carboxylic acid having not more than 18 carbon atoms into said oil and allowing said mixture to harden.

No references cited.